No. 829,413. PATENTED AUG. 28, 1906.
J. MÉLOTTE.
TRANSMISSION SYSTEM FOR AUTOMOBILES.
APPLICATION FILED AUG. 1, 1905.
2 SHEETS—SHEET 1.
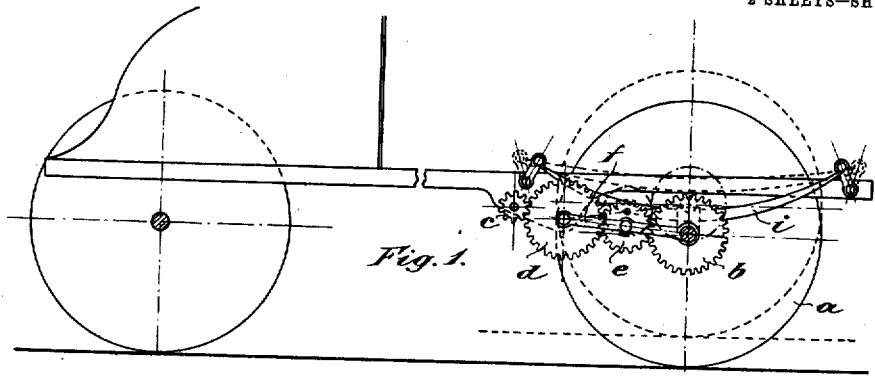
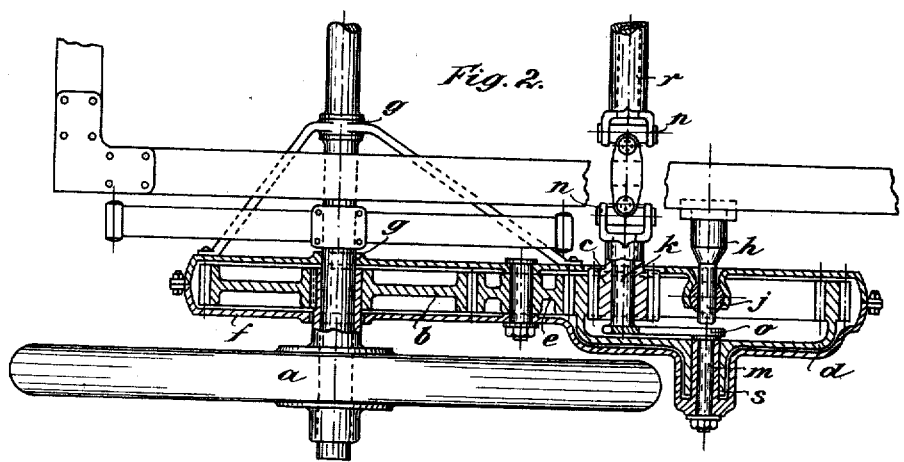
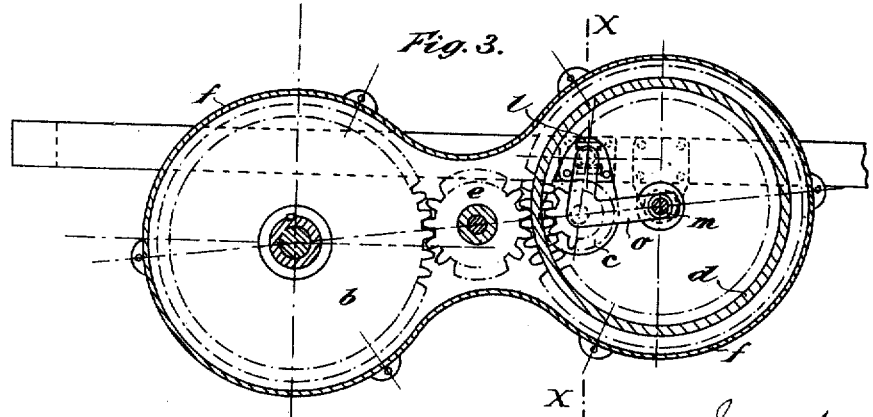

No. 829,413. PATENTED AUG. 28, 1906.
J. MÉLOTTE.
TRANSMISSION SYSTEM FOR AUTOMOBILES.
APPLICATION FILED AUG. 1, 1905.

2 SHEETS—SHEET 2.

Witnesses
E. Harrener
B. C. Rust

Inventor
Jules Mélotte
By Foster Freeman & Watson
Attorneys

UNITED STATES PATENT OFFICE.

JULES MÉLOTTE, OF REMICOURT, BELGIUM.

TRANSMISSION SYSTEM FOR AUTOMOBILES.

No. 829,413.

Specification of Letters Patent.

Patented Aug. 28, 1906.

Application filed August 1, 1905. Serial No. 272,272.

*To all whom it may concern:*

Be it known that I, JULES MÉLOTTE, a subject of the King of Belgium, residing at Remicourt, Belgium, have invented certain new and useful Improvements in the Transmission Systems of Automobiles; and I do hereby declare the following to be a full, clear, and exact description of the invention, such as will enable others skilled in the art to which it appertains to make and use the same.

When the motion of the pinions which are carried by the shafts of the differential is transmitted through the medium of a chain, for example, to a toothed wheel fixed to a road-wheel of the vehicle, the axle of this wheel (which supports the chassis through the medium of springs) is constantly approaching or receding from the chassis as a consequence of the jerks or shocks which are imparted to it by the unevenness of the road-surface over which the vehicle is traveling, and as the bearings of the driving-pinion are rigidly fixed to the said chassis the said pinion is necessarily compelled to move bodily with the chassis as the latter approaches or recedes from the ground, while the road-wheel axle of course always remains at the same distance from the ground, and thus relative displacements between the axis of the driving-pinion and the road-wheel are produced, and these displacements cannot take place without one of the two parts (either the pinion or the wheel) turning. As a consequence, if the wheel turns without the chassis advancing or receding it will slip upon the ground, and in order to turn the pinion, if the gearing is clutched to the motor, it is necessary to cause this latter to turn or to slip the clutch. Such slippings of the clutch and of the wheel in addition to considerably increasing the strain upon the motor cannot take place without resulting in great strain being also thrown upon the transmission mechanism.

The present invention has for its object to remedy these serious inconveniences so far as they concern the reduction of the speed of the motor and to prevent the displacements of the chassis with reference to the road-wheel axle from influencing the speed of the motor.

The annexed drawings represent some variations of mechanism of this kind.

Figure 4:
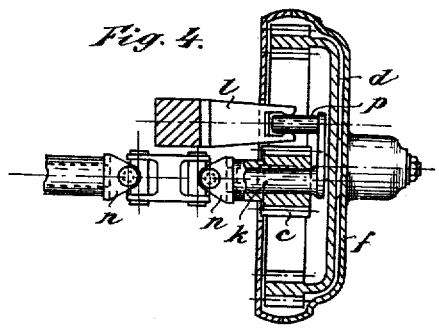
Figure 5:
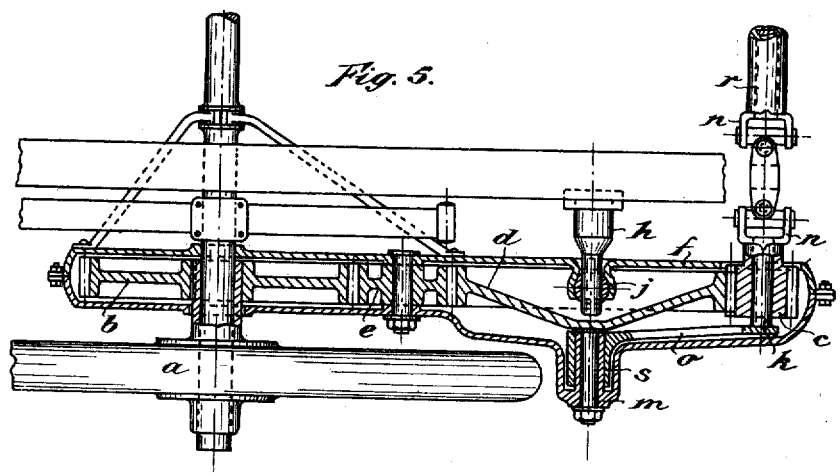
Figure 6:
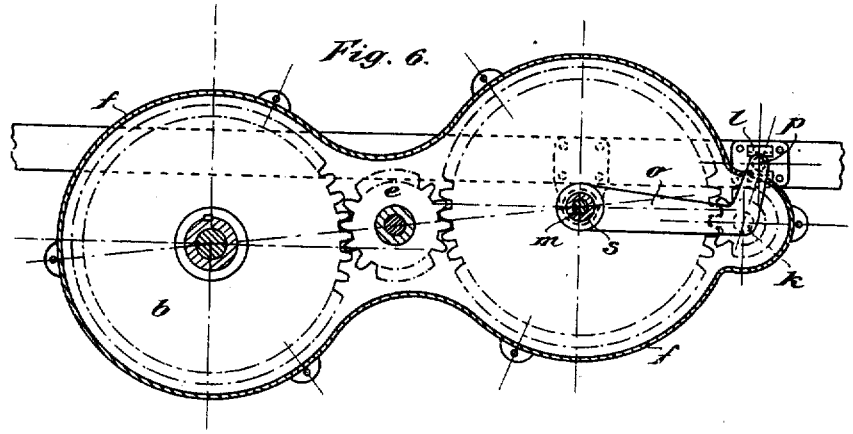

Figure 1 shows diagrammatically a direct transmission by pinions. Fig. 2 is a horizontal section in an arrangement permitting of the practical realization of this system. Fig. 3 is a view in elevation, and Fig. 4 is a section through $x$ $x$, Fig. 2. Figs. 5 and 6 show, respectively, in horizontal section and in elevation an arrangement of the same kind.

In motor vehicles or carriages it is necessary to employ a driving-pinion which is smaller than the driven wheel, so as to cause the differential to run at a greater speed than the driven wheel and also to reduce the strains which are set up in the parts which drive the differential in the parts of the differential itself and in the spindles of the driving-pinions of the chain or of pinions which take the place of the chain-pinion.

In the mechanism such as is represented in Fig. 1 the pinion $c$, fixed on one of the ends of the transverse shafts of the differential, indirectly drives the driven wheel $b$, fixed on or solid with the wheel $a$ of the vehicle. The pinion $c$ first gears with a toothed wheel $d$, carried by the chassis and having a diameter equal to that of the wheel $b$, carried by the spring $i$.

When the car is driven by chain or by gearing or by a combination of these methods of driving, it is proposed to insert between the driving-pinion and the driven wheel an intermediate wheel (or its equivalent) mounted on the chassis and of the same diameter as the driven wheel. In this case the driving-wheel during its vertical displacements with reference to the axle always runs up the chain of an extent equal to that which the driven wheel runs off the said chain.

The radius-rod $f'$, which is generally employed to maintain the road-wheel axle at a constant distance from the driving-pinion $c$, must in this case be jointed to the center of the intermediate wheel, so as to provide for its angular motion around this point and to render equal the lengths of top and bottom parts of the chain affected by the relative displacements of the chassis and road-wheel axle.

Fig. 2 represents in horizontal section an arrangement which permits of the driving-wheel $d$ directly gearing with an intermediate pinion and which is itself driven by a pinion $c$ on the differential counter-shaft. $a$ is the road-wheel of the vehicle, on the hub of which is fixed the toothed wheel $b$, receiving its motion from the counter-shaft pinion $c$ through the medium of the internal and external toothed wheel $d$ and the small intermediate pinion $e$.

Fig. 3 is a front view of the mechanism, and Fig. 4 is a partial section through X X.

The several parts are inclosed in a gear-box $f$, which is mounted on the axle of the wheel $a$ by the bearings $g\ g$ and is also secured to the chassis by the pin $h$. The gear-box $f$, with the parts which it carries, is free to move in several directions round the sphere $j$, which is supported on the pin $h$ and is capable of sliding laterally thereon. The pinion $c$ receives its motion from the differential by the axle $r$ and the universal joint $n\ n$, and it turns freely upon an axle $k$, which is connected through the medium of a jointed link $o$ with an axle $m$, which is disposed concentrically with respect to the axis of rotation of the wheel $d$, whose bearing is upon a sleeve $s$, fixed to the side of the gear-box $f$. This axle $k$ is rigidly connected with the axle $m$ and the arm $o$, and the whole constitutes a jointed crank arrangement. The axle $m$ passes into the bearing-sleeve $s$, which is supported by the gear-box $f$, and in consequence it is obliged to follow the angular movements of the said box around the sphere $j$ and to slide laterally with it upon the pin $h$; but it is prevented from turning itself by means of a pin $p$, carried by an upward extension of the crank-arm $o$ and engaging between a pair of flanges or ledges of an attachment $l$, fixed to the chassis. (See Figs. 3 and 4.) In this resides the essential feature of the invention, which consists in mounting the axis of pinion $c$ so that it is capable of following every movement of the gear-box except its angular movement around the axis $h$. It has been explained that the axle can thus approach or recede from the chassis without turning the driving-wheel or the driven wheel around these axes, and as the axis of the pinion $c$ is incapable of turning movement round $h$ the pinion will not turn, and in consequence this movement will not influence the speed of the motor while running.

The pinion receives its movement from the axle $r$ by the universal joint $n\ n$ and transmits it to the internal toothed wheel $d$, which by its external teeth drives the intermediate wheel $e$, and the latter in its turn drives the wheel $b$, fixed on the hub of the road-wheel $a$ of the vehicle. By the use of the cranked arm $k\ o\ m\ p$ the pinion is compelled always to gear in a suitable manner with the wheel $d$. As a consequence the axis $m$ of the said crank follows all the angular and lateral movements of the gear-box $f$ and gear elements $d\ e\ b$ around the sphere $j$ and upon the pin $h$, respectively. Consequently the axis $k$ always remains parallel to all the other axes whatever may be the position of the gear-box. As the pin $p$ of the crank $k\ o\ m\ p$ engages between the flanges of the fitting $l$, it prevents the said crank from turning around the axis $m$, and in consequence secures the axis $k$ of the pinion.

Figs. 5 and 6 show, respectively, in horizontal section and in elevation an arrangement of the same kind, in which the driving-pinion $c$ instead of being placed in the interior of an internal toothed wheel is placed on the outside of and is adapted to directly drive an external toothed wheel $d$, which transmits the motion through the medium of the intermediate wheel $e$ to the wheel $b$, fixed on the road-wheel axle of the vehicle. In this case the wheel $d$, Fig. 5, has an axis turning directly in the sleeve $s$ of the gear-box, while the crank $k\ m\ o\ p$ has a bearing fitting onto the outside of the same sleeve $s$.

Having fully described my invention, what I desire to claim and secure by Letters Patent is—

1. A transmission system for automobile, comprising a driving-pinion, a driving-wheel, a driven wheel and an intermediate pinion, the axles of said driving-pinion and driving-wheel being mounted on the chassis and adapted to move relative to the axles of the other pinion and wheel, the driving-wheel and the driven wheel being of substantially the same diameter.

2. The combination with an automobile-axle and a spring-mounted chassis, of a gear-box arranged to oscillate in an arc concentric with said axle and connected to said chassis by a mounting adapted to permit relative movement in several directions, a gear-wheel pivoted in said box, and a pinion arranged in said box to mesh with said wheel, the axis of said pinion being adapted to follow the relative movements of the gear-box except its annular movement around said mounting.

3. The combination with an automobile-axle and a spring-mounted chassis, of a gear-box arranged to oscillate on said axle and connected with said chassis by a mounting adapted to permit relative movement in several directions, a pivot-pin arranged in said box, a gear-wheel mounted to rotate around said pin, a pinion mounted to oscillate around said pin, and means adapted to prevent the oscillation of said pinion around said mounting.

4. The combination with an automobile-axle and a spring-mounted chassis, of a gear-box arranged to oscillate on said axle and connected with said chassis by a mounting adapted to permit relative movement in several directions, a driven wheel fast on said axle, a driving-wheel and an intermediate pinion mounted in said box, and a driving-pinion mounted on an arm adapted to swing in an arc concentric with the axis of said driving-wheel, said arm engaging with a projection on the chassis whereby it is prevented from swinging around said mounting.

5. The combination with an automobile-axle and a spring-mounted chassis, of a gear-box arranged to oscillate in an arc concentric with said axle and connected to said chassis by a mounting adapted to permit relative movement in several directions, a driven wheel fast on said axle, a driving-wheel pivoted in said box concentric with said mounting when said box is in normal position, an intermediate pinion between said wheels, and a driving-pinion pivoted on an arm adapted to partake of all of the movements of said box except its annular movement around said mounting, said pinion having a universal joint connection with the motor-shaft.

In testimony whereof I have signed my name to this specification in the presence of two subscribing witnesses.

JULES MÉLOTTE.

Witnesses:
 VICTOR HAMAL,
 JEAN WINGEN.